United States Patent [19]

Sugawara et al.

[11] 4,233,663

[45] Nov. 11, 1980

[54] APPARATUS FOR ESTIMATING A NECESSARY AMOUNT OF INK

[75] Inventors: Kazuo Sugawara; Sei Sanada, both of Tokyo; Yosiharu Kobayashi, Yokohama, all of Japan

[73] Assignee: Toppan Printing Co., Ltd., Tokyo, Japan

[21] Appl. No.: 968,700

[22] Filed: Dec. 12, 1978

[30] Foreign Application Priority Data

Dec. 15, 1977 [JP] Japan ................................ 52-151033

[51] Int. Cl.³ .......................... H04N 1/22; B41M 1/10

[52] U.S. Cl. .................................... 364/515; 101/170; 358/196

[58] Field of Search ........................ 364/515, 518, 400; 358/280, 296, 256, 298; 346/75, 146; 101/350, 365, 170; 250/226, 568, 570

[56] References Cited

U.S. PATENT DOCUMENTS 3,751,159 8/1973 Fisher .............................. 358/256 X 3,944,726 3/1976 Ito ........................................ 358/256

4,112,469 9/1978 Paranjpe et al. ..................... 358/296

4,135,212 1/1979 Pugsley et al. .................. 358/296 X

*Primary Examiner*—Joseph F. Ruggiero

*Attorney, Agent, or Firm*—Frishauf, Holtz, Goodman & Woodward

[57] ABSTRACT

There is provided an apparatus for estimating a necessary amount of ink for printing which comprises a reading head for scanning an original print to produce analog signals representing the optical densities of the picture dots of the original print, an A-D converter for converting the analog signal from the reading head into digital signal representing one of 256 optical density levels of the picture dot on the original print, a plurality of level counters for classifying the digital signals from the A-D converter into 256 groups each including the digital signals representing the same optical density level and counting the digital signals for each group, and a system controller for multiplying the number of digital signals in each group and the amount of ink required to print the picture dot at a corresponding optical density level to produce the total amount of ink required to print all the picture dots on the original print.

5 Claims, 5 Drawing Figures

APPARATUS FOR ESTIMATING A NECESSARY AMOUNT OF INK

BACKGROUND OF THE INVENTION

This invention relates to an apparatus for estimating an amount of ink to be consumed in printing.

Inks used for general printing materials such as magazines, catalogues and posters are in most cases yellow (Y), magenta (M), cyan (C), black (BK) and the like. Since these inks are used in large quantities for general printing, they can be used, if left over, for other printing and thus are never wasted.

To print special printing materials such as wallpaper, wrapping paper and printed panels, inks of special colors are used in most cases. They are prepared for specific purposes by mixing two or more inks of primary colors in a proper ratio. Such inks cannot be used for other printing. If left over, they are inevitably wasted. If the necessary amount of such a special ink is correctly estimated before printing thereby to reduce the amount of excessive ink it would be quite economical.

Hitherto, a necessary amount of ink has been predicted by a skilled printer. Or, in gravure printing, a necessary amount of ink has been estimated by measuring the total amount of ink cells from the shavings of the printing plate. The first-mentioned method solely depends on the printer's hunch, and the estimated amount often turns out to be so incorrect that much ink is wanting or left over. If the estimated amount is found insufficient, the ink has to be prepared again. It is, however, extremely difficult to prepare an ink of the identical color. The second-mentioned method is time-consuming and nontheless fails to estimate the necessary amount of ink very correctly. Further, this method cannot be applied to other types of printing than gravure printing.

An object of this invention is to provide an apparatus which can estimate a necessary amount of ink accurately and easily.

SUMMARY OF THE INVENTION

According to this invention, there is provided an apparatus comprising a photoelectric converter for producing analog signals representing the optical densities of the various parts of an original print; and A-D converter for converting the analog signals from the photoelectric converter into digital signals representing the optical densities of unit areas of the original print; level counters for classifying the digital signals from the A-D converter into groups of different levels and counting the numbers of digital signals of the respective groups calculating means for calculating an amount of ink to apply on a printing plate, based on the counted numbers of the each level counters and an amount of ink of each level to apply on a unit areas of the printing plate which correspond to the digital signals and for calculating an amount of ink necessary to print one sheet by multiplying a correction coefficient by the amount of ink thus calculated; and a display device for displaying the amount of ink calculated by the calculating means.

DETAILED DESCRIPTION

Figure 1:
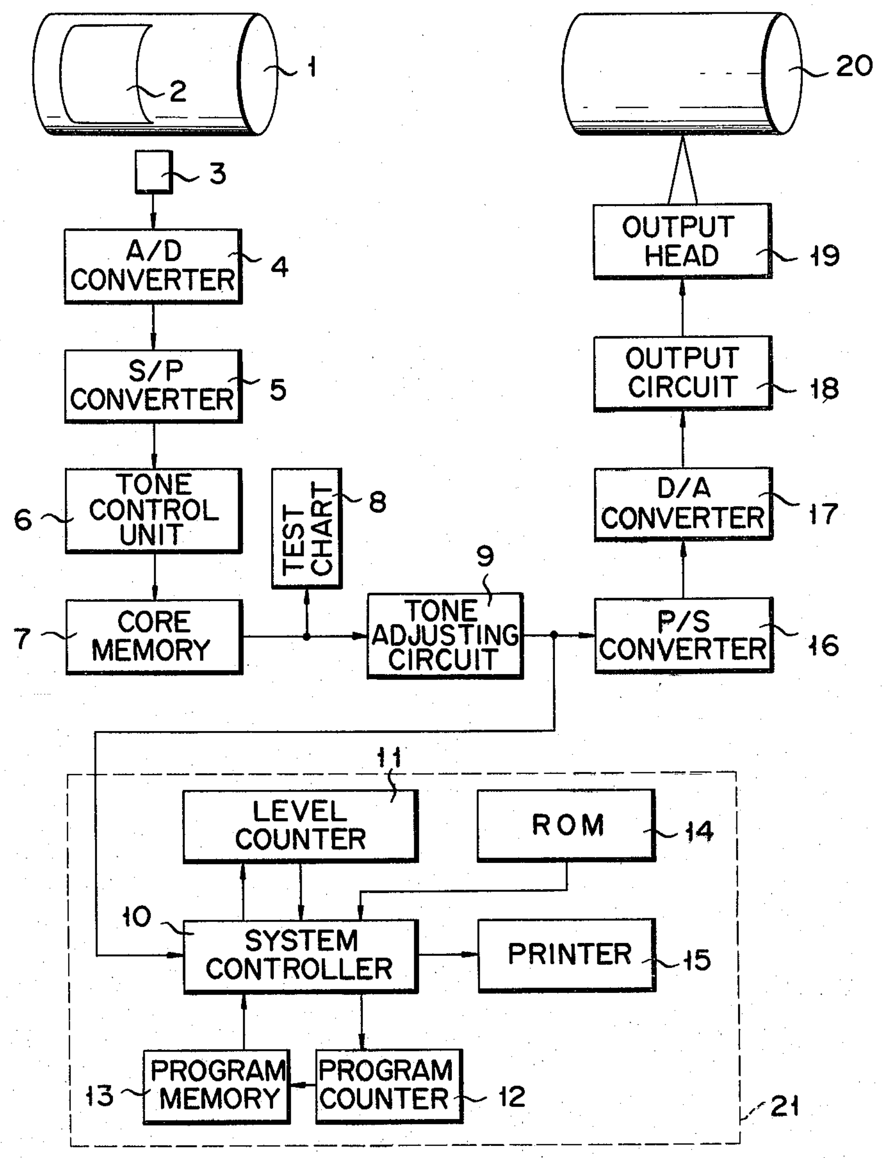
FIG. 1 is a block diagram schematically showing an ink amount estimating apparatus according to this invention.

As shown in FIG. 1, an apparatus according to this invention is assisted by an electronic color scanner having a scanning drum 1, thereby to prepare a gravure printing plate. On the scanning drum 1 an original print 2 is laid. The drum 1 is made of a transparent material. Thus, a beam of light from a light source (not shown) disposed in the drum 1 can scan the original print 2. The scanning beam passing through the original print 2 is caught by a reading head 3 which is constituted by a photocell. The reading head 3 converts the beam into an analog signal, which is converted into a digital signal by an A-D converter 4.

Analog signals of different amplitudes are produced by the reading head 3 one after another as the beam scans the original print 2. All the analog signals are not converted into digital signals. Some of them are sampled out and then converted into digital signals, so that the digital signals may correspond to the respective ink cells of a gravure printing plate which is to be made. The digital signals are classified into 256 groups according to the maximum amplitudes of the corresponding analog signals. The digital signals having different 256 levels are therefore provided.

The digital signals from the A-D converter 4 are serial signals. They are converted by a serial-parallel (S-P) circuit 50 into parallel signals, whereby the digital signals will be later processed easily by a computer easily. The outputs of the S-P circuit 5 are supplied to a regulating circuit or to a tone control circuit 6. The circuit 6 regulates the optical densities of the original print 2 to correct color densities which are to be corresponded to printing plate. The parallel digital signals from the circuit 6 are stored into a core memory 7. The contents of the core memory 7 are recorded on a test chart 8 and at the same time supplied to adjusting circuit 9. This circuit 9 adjusts color density to be printed to desirable color. A checker checks the data recorded on the test chart 8 and, if necessary, operates the adjusting circuit 9.

The digital signals thus classified are supplied via a system controller 10 to 256 level counters 11 for counting the digital signals of the respective groups or levels. The level counters 11 keep operating until the electronic color scanner finishes scanning the original print 2 laid on the scanning drum 1. The system controller 10 is constituted, preferably, by a microcomputer.

Upon detecting the end of signal supply to the level counters 11, the system controller 10 produces an end signal, which is supplied to a program counter 12. In response to the end signal the program counter 12 advances one step, thereby reading a following program from a program memory 13. The program is supplied to the system controller 10. The system controller 10 executes this program, thus multiplying each count of the level counter 11 by a volume data from a ROM 14 which represents the volume of each of the ink cells corresponding to the digital signals of the same level counted by any one of the level counters 11. That is, the ROM permanently stores volume data of each level which correspond to the respective levels of digital signals and which have been obtained beforehand by computation.

When such multiplication has been completed with respect to all the digital signals, the system controller 10 produces an end signal, which is suppled to the program counter 12. In response to the end signal the program counter 12 advances one step, thereby reading the next program from the program memory 13. This program is supplied to the system controller 10. The system controller 10 executes the program, thereby adding up all the products of the multiplication. In the other words, the system controller 10 obtains the total volume of all the ink cells of the gravure printing plate.

In practice, all the ink in each ink cell is not transferred to a printing paper. A considerable amount of ink stays in the ink cell. The amount of such residual ink depends on various factors such as printing speed, the quality of printing paper, the doctor pressure, the viscosity of ink, the temperature of ink, the ambient temperature and the ambient humidity. Data on these factors are fed to the system controller 10 thereby to correct the total volume of all ink cells of the gravure printing plate. The corrected total volume of ink cells is an estimated amount of ink necessary to print one sheet of paper. Merely by mulitplying this estimated amount of ink by the number of sheets to be printed, the amount of ink necessary to print all the sheets can be estimated. The amount of ink thus estimated is supplied to, and printed by, a printer 15, if necessary.

Figure 2A:
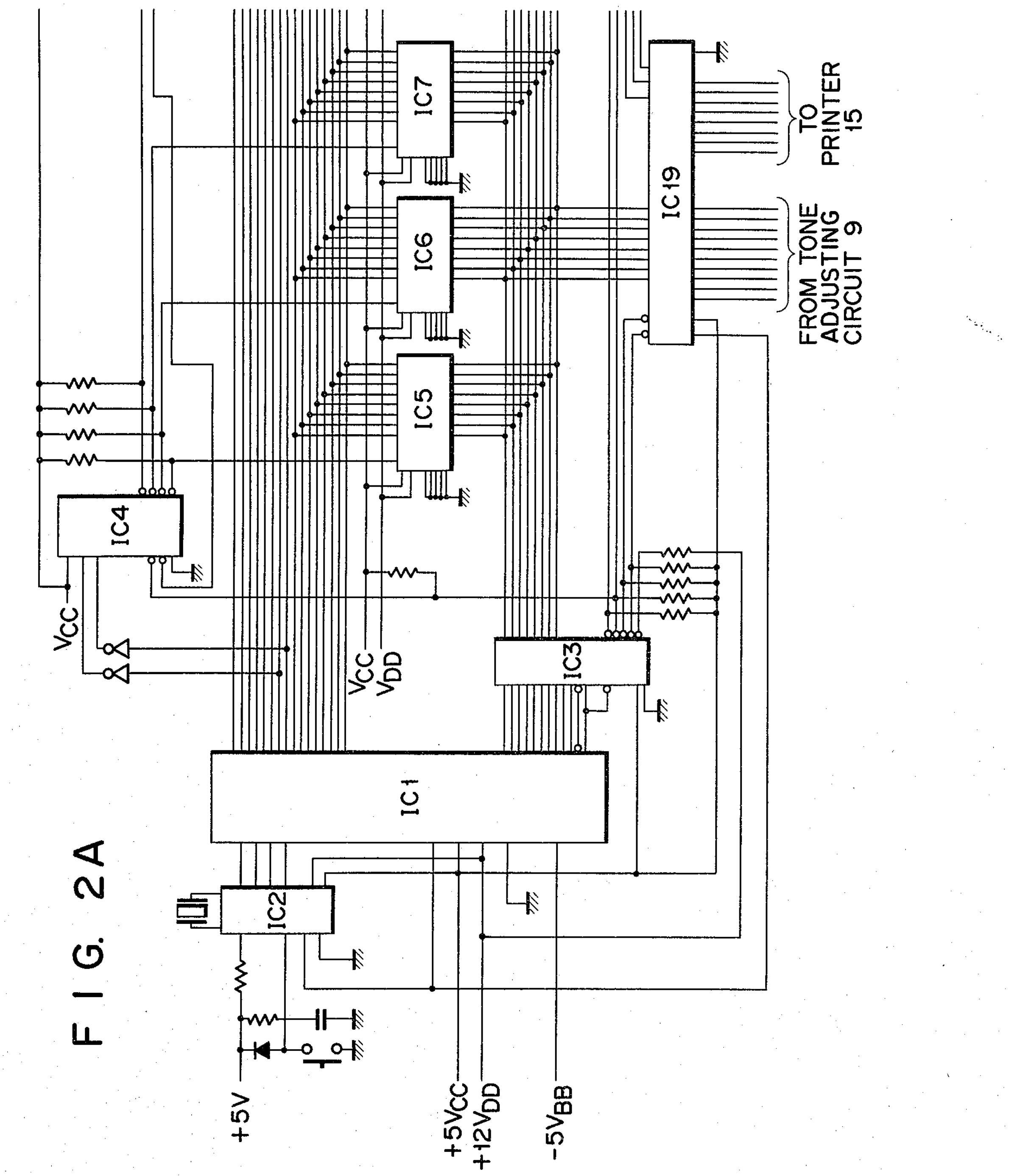
FIGS. 2A to 2C jointly show a circuit diagram showing the calculating unit of the apparatus shown in FIG. 1.
Figure 2B:
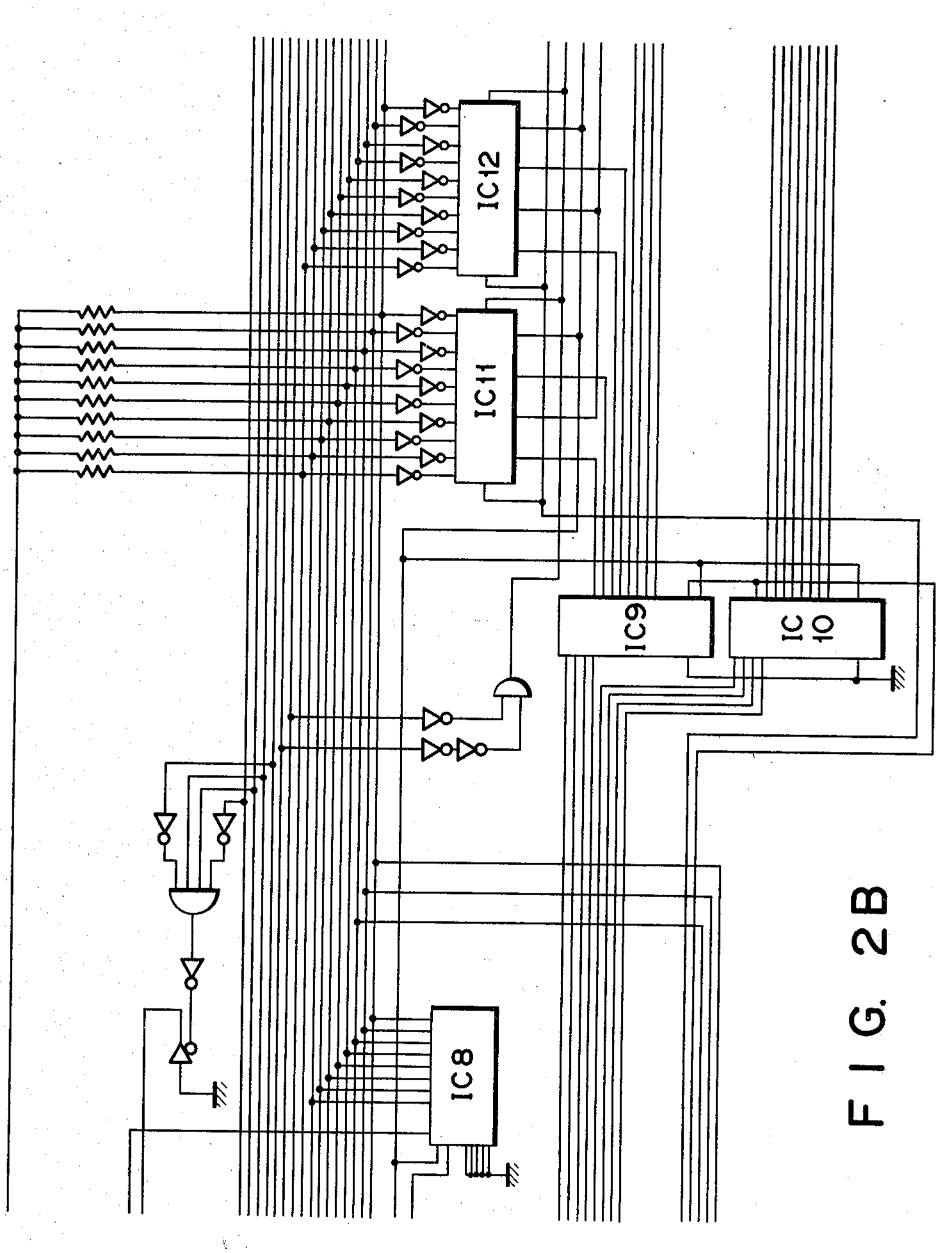
Figure 2C:
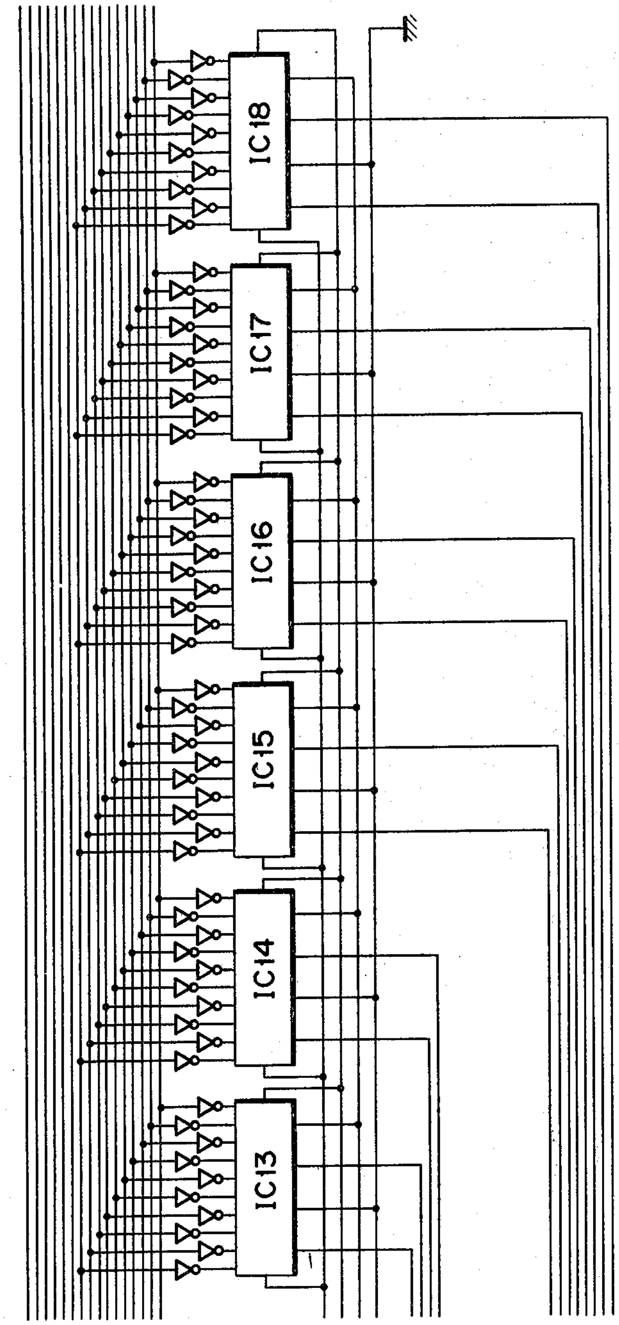

The system controller 10, level counters 11, program counter 12, program memory 13, ROM 14 and printer 15 constitute a calculating unit 21. As shown in FIGS. 2A to 2C, the system controller 10 is constituted by a microcomputer IC1 and two peripheral IC circuits IC2 and IC3. The microcomputer IC1 is arranged to receive the output signals of the adjusting circuit 9 and contains the program counter 12. Further provided is a decoder IC4 for accessing the program memory 13, the ROM 14 and the level counters 11. The program memory 13 is constituted by two IC circuits IC5 and IC6, and the ROM 14 by two IC circuits IC7 and IC8 for storing the volume data. The level counters 11 are constituted by IC circuits IC11 to IC18, respectively. The calculation unit 21 further comprises a bus driver constituted by two IC circuits IC9 and IC10 for driving the level counters IC11 to IC18 and an input-output interface IC19 between the adjusting circuit 9 and the printer 15.

The output signals of the adjusting circuit 9 are used not only to estimate a necessary amount of ink but also to form ink cells in the printing plate. For forming ink cells the output signals are converted by a P-S circuit 16 into serial digital signals, which are supplied to a D-A converter 17. Thus, the serial digital signals are converted into analog signals. These analog signals are supplied through an output control circuit 18 to an output head 19. Driven by the analog signals, the output head 19 forms in a printing plate 20 ink cells in a pattern which corresponds to the original print 2.

Figure 3:
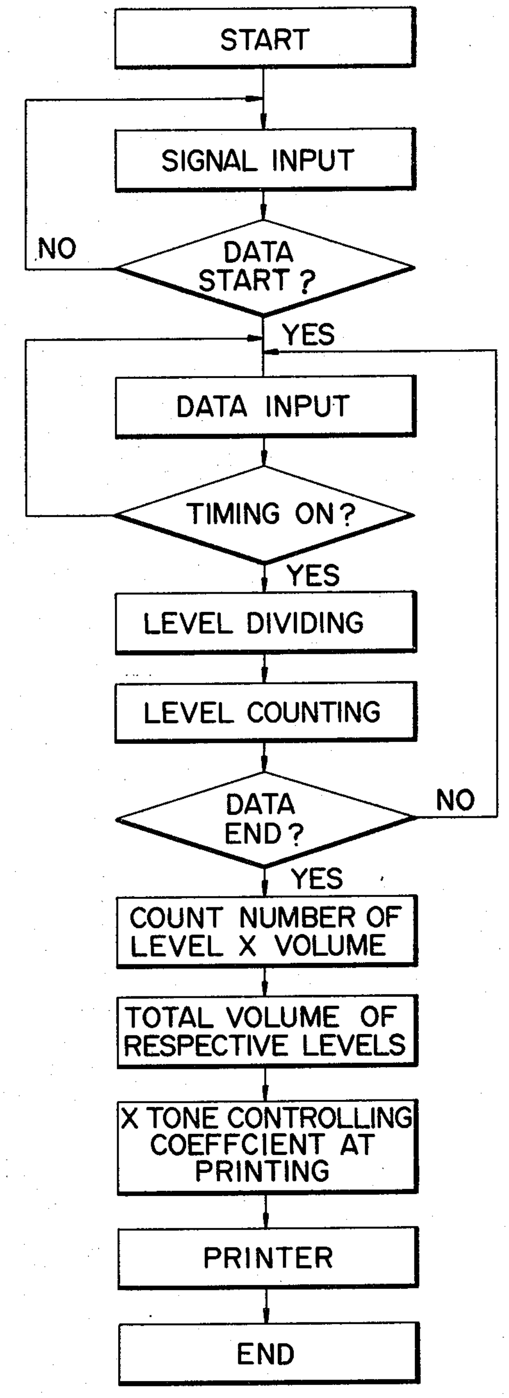
FIG. 3 is a flow chart showing how the apparatus of FIG. 1 is operated.

With reference to a flow chart shown in FIG. 3 it will be described how the apparatus illustrated in FIG. 1 does operate.

After the original print 2 has been laid on the scanning drum 1, a start signal is produced to set the system controller 10 and start the scanning of the original print 2. When the scanning begins, the reading head 3 starts producing analog signals. The analog signals are converted by the A-D converter 4 into digital signals, which are supplied to the system controller 10. Upon receiving the first digital signal, the system controller 10 produces a data input signal. So long as the system controller 10 receives no digital signal, the whole apparatus remains operating.

As the digital signals are supplied to the system controller 10, sampling pulses are supplied to the system controller 10, too. The sampling pulses are superposed on the digital signals. The system controller 10 checks whether the sampling pulses positionally coincide with the digital signals. If the pulses are found to coincide positionally with the digital signals, the system controller starts distributing the digital signals to the respective level counters 11 according to their levels. Otherwise, the system controller 10 remains to distribute the digital signals to the level counters 11. All the digital signals are to coincide positionally with the sampling pulses. But some of them may not coincide with the sampling pulses. Such digital signals are considered noise and are erased automatically as the following digital signals are fed to the system controller 10. In this way the noise elimination is effected.

Since the digital signals have been distributed by the system controller 10 according to their levels, each level counter 11 counts digital signals of the same level. When the scanning of the original print 2 ends, the system controller 10 beings to multiply the count of each level counter 11 by a volume data from the ROM 14. If the scanning continues, the system controller 10 keeps distributing incoming digital signals to the respective level counters 11.

The volume data permanently stored in the ROM 14 represent the volumes of ink cells which are to be formed in the printing plate and the volumes of which correspond to the levels of the digital signals. Thus, the total volume $V_L$ of the ink cells having a volume $v_l$ and corresponding to the digital signals of the same level can be obtained by mulitplying the volume $v_l$ and the number N of the digital signals, as shown below:

$$V_L = N \times v_l \quad (1)$$

After the count of all the level counters 11 have been multiplied by the respective volume data read out from the ROM 14, the volume V of all ink cells to be formed on the printing plate is obtained by the following formula:

$$V = \sum_{L=0}^{255} V_L \quad (2)$$

In formula (2), L denotes the level of the digital signals and L=0, 1, 2, . . . 255.

The volume V thus obtained corresponds to the total amount of ink to fill up all the ink cells of the printing plate. In practice, the amount of ink necessary to print one sheet is less than V for the aforementioned reason. This necessary amount $V_F$ is therefore expressed by the following formula, where $\alpha$ denotes a correction coefficient:

$$\alpha \cdot V_F = V \quad (3)$$

The necessary amount $V_F$ of ink is printed out by the printer 15.

Using the apparatus according to this invention, a three colorgravure plate was prepared and the necessary amount of ink was estimated. The size of the plate was 510 mm × 1000 mm. The printing was conducted at 25° C., humidity 60%, using an ink the temperature and SUS viscosity of which were 24.5° C. and 30 seconds, respectively. The printing speed was 40 mm/min, the printing length was 1000 m, and the doctor pressure was 3 Kg. Under these conditions of printing, 43% of the ink to fill up the ink cells of the plate was known to be transferred onto the printing paper. Using this ink transfer rate as a correction coefficient, the necessary amount of ink was estimated to be 2.3 Kg/1000 m. After printing, it was found that 2.2 Kg of ink was consumed per 1000 m. This proved that the apparatus had accurately estimated the necessary amount of ink.

Practically, some ink sticks on the surface of the printing plate and drops into an ink well. Thus, the ink must be prepared in an amount which equals the sum of the estimated amount and the amount of ink to stick on the plate and drop into the ink well.

The above described embodiment of this invention is so designed as to produce a gravure printing plate, Instead, this invention may be employed to produce a lithographic plate or a halftone block. If the invention is applied to lithographic or letterpress printing, the ROM 14 stores area data which represent the ratio of the screen dot in unit screens on the printing plate since the ratio determines the color densities of various parts of a printed sheet.

As mentioned above, the apparatus according to this invention can estimate a necessary amount of ink accurately and easily, whereby a special ink is never wasted. This invention therefore helps achieve an extremely economical printing.

While there has been described what is, at present, considered to be preferred embodiment of this invention, it will be obvious to those skilled in the art that various changes and modifications may be made therein without departing from the invention, and it is, therefore, aimed to cover all such changes and modifications as fall within the true spirit and scope of the invention.

What we claim is:

1. An apparatus for estimating a necessary amount of ink for printing, comprising:

a photoelectric converter for producing analog signals representing the optical densities of the various parts of an original print;

an A-D converter for converting the analog signals from the photoelectric converter into digital signals representing the optical densities of unit areas of the original print;

a plurality of level counters for classifying the digital signals from the A-D converter into groups of different levels and counting the numbers of digital signals of the respective groups;

calculating means for calculating an amount of ink to apply on a printing plate, based on the counts of each level counter and an amount of ink to apply on each of the unit areas of the printing plate which correspond to the digital signals and for calculating an amount of ink necessary to print one sheet by multiplying a correction coefficient by the amount of ink thus calculated; and a display device for displaying the amount of ink calculated by the calculating means.

2. An apparatus according to claim 1, wherein said unit areas correspond to unit screens of printing.

3. An apparatus according to claim 1 or 2, wherein the amount of ink for every unit area corresponds to the volume of an ink cell formed in a gravure plate.

4. An apparatus according to claim 1 or 2, wherein the amount of ink for every unit area corresponds to the area of an unit screen of a lithographic plate.

5. An apparatus according to claim 1 or 2, wherein the amount of ink for every unit area corresponds to the area of a halftone block.

* * * * *